United States Patent [19]
Field et al.

[11] 3,973,242
[45] Aug. 3, 1976

[54] DIGITAL RECEIVER

[75] Inventors: Robert G. Field, Millis; Donn A. Wahl, Dedham, both of Mass.

[73] Assignee: GTE Sylvania Incorporated, Stamford, Conn.

[22] Filed: Feb. 27, 1975

[21] Appl. No.: 553,467

[52] U.S. Cl.................... 340/168 B; 340/146.1 BA; 340/168 S; 340/147 MD
[51] Int. Cl.² .......................................... H04Q 9/16
[58] Field of Search............... 340/146.1 BA, 168 R, 340/168 B, 168 S; 178/23 A; 325/322

[56] References Cited
UNITED STATES PATENTS

| | | | |
|---|---|---|---|
| 3,523,278 | 8/1970 | Hinkel...................... | 340/146.1 BA |
| 3,772,649 | 11/1973 | Haselwood................ | 340/146.1 BA |
| 3,781,792 | 12/1973 | Birkin....................... | 340/146.1 BA |
| 3,798,549 | 3/1974 | Ollinger.................... | 340/146.1 BA |

*Primary Examiner*—Harold I. Pitts
*Attorney, Agent, or Firm*—David M. Keay; Elmer J. Nealon; Norman J. O'Malley

[57] ABSTRACT

A digital receiver for receiving 8-bit permutable address code words. Before receiving each address code word the receiver must be activated by receiving five consecutive identical words of an interdigit signal of alternating 1's and 0's. The receiver must then receive the same address code word five times in succession in order to accept it. The incoming signals are applied to a 9-bit shift register. Each bit is counted by a counter, but if the bits in the first and ninth stages of the shift register are different, the counter is cleared. When the count in the counter indicates five identical 8-bit words have been received in succession and an interdigit detector detects that the word in the last eight stages of the shift register is an interdigit word, a state flip-flop is set activating the receiver. The next time the counter reaches a count indicating that five identical 8-bit words have been received in succession if the interdigit detector indicates that the word in the last eight stages of the shift register is not an interdigit word, a ready flip-flop is set latching the contents of the last eight stages of the shift register in a holding register.

5 Claims, 4 Drawing Figures

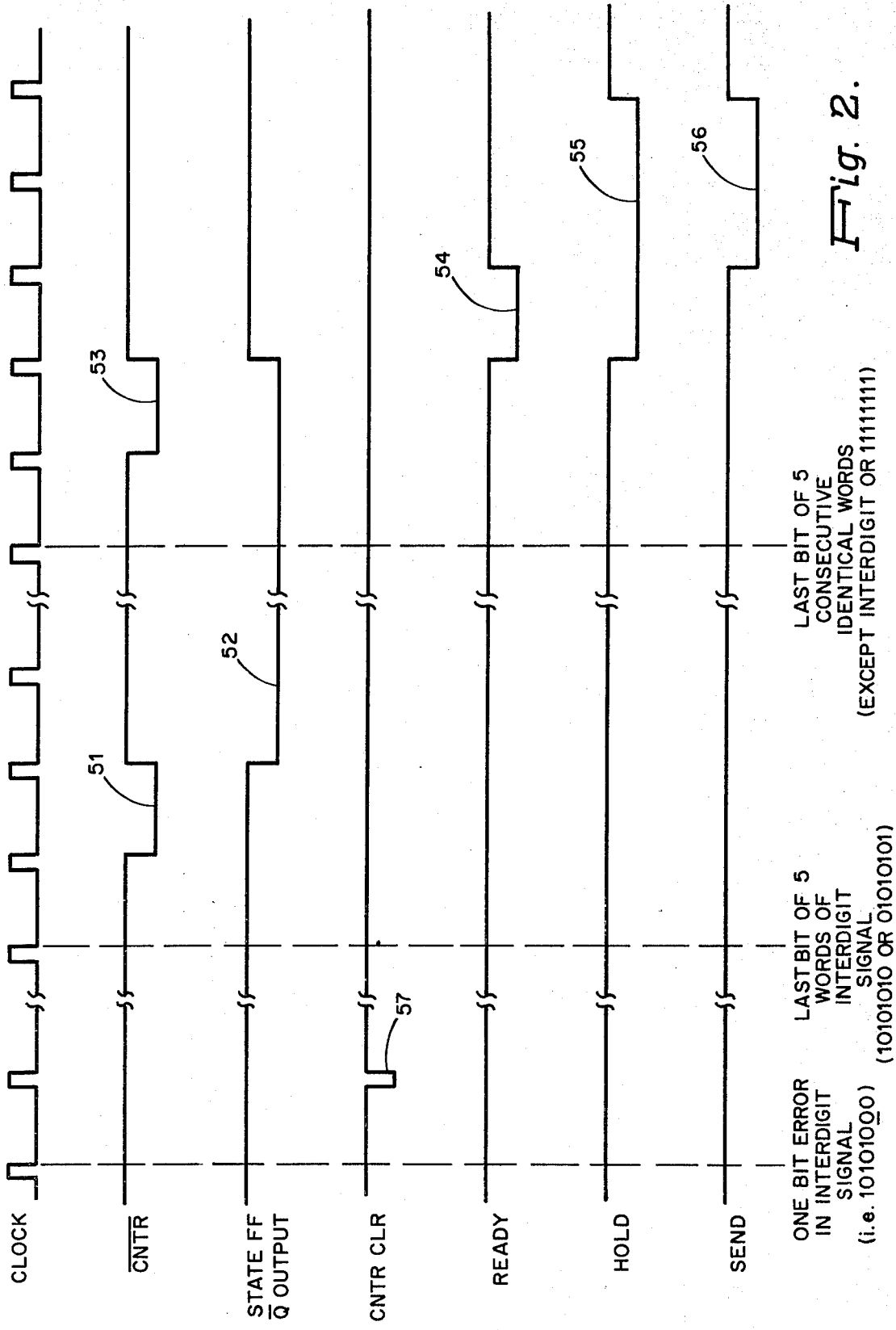

DIGITAL RECEIVER

BACKGROUND OF THE INVENTION

This invention relates to apparatus for receiving digital signals. More particularly, it is concerned with a digital receiver which is activated by a preparatory digital signal prior to receiving digital information.

In a digital telephone communication system of a certain type during the placing of a call a receiver is assigned to the calling subset and a dial signal is applied to the subset. The subset then produces a digital signal which is designated an interdigit signal. Address code signals are transmitted to the receiver by the subset as by the operation of a key set. The interdigit signal is interrupted by an address code signal but occurs whenever an address code signal is not being transmitted.

In order to insure accuracy of the address code signals received and accepted by the assigned receiver it is desired that the receiver by activated to receive each address code signal only after confirming that the preparatory interdigit signal has been received several times in succession. After activation by receipt of several consecutive words of the interdigit signal the receiver must receive an identical address code word several times in succession before the address code word is accepted as valid.

SUMMARY OF THE INVENTION

Digital receiving apparatus for receiving a predetermined number of particular digital code words, for example interdigit code words, and then a predetermined number of identical digital words, for example address code words, in accordance with the present invention includes an input storage means for receiving and storing digital words. A detection means detects the presence or absence of particular digital code words (the interdigit code words) in the input storage means. A counting means determines when the input storage means has received a predetermined number of identical digital words in succession.

The apparatus also includes a first control means which is coupled to the detection means and to the counting means. The first control means produces an indication in response to a determination that the predetermined number of identical particular digital code words (the interdigit code words) have been received by the input storage means. A second control means is coupled to the detection means, to the counting means, and also to the first control means. The second control means produces an indication in response to the detection means detecting the absence of the particular digital code words (the interdigit code words) in the input storage means and the counting means determining that the input storage means has received the predetermined number of identical digital words in succession while the first control means is producing an indication.

An output storage means is coupled to the input storage means and to the second control means. The output storage means receives and stores a digital word stored in the input storage means in response to an indication from the second control means. An output gating means is coupled to the output storage means, and an output control means applies a readout signal to the output gating means in order to cause the digital word stored in the output storage means to be read out.

BRIEF DESCRIPTION OF THE DRAWINGS

Additional objects, features, and advantages of digital receiving apparatus in accordance with the present invention will be apparent from the following detailed discussion together with the accompanying drawings wherein:

FIG. 2 is a timing diagram illustrating the operation of the digital receiver of FIG. 1.

DETAILED DESCRIPTION OF THE INVENTION

Figure 1:
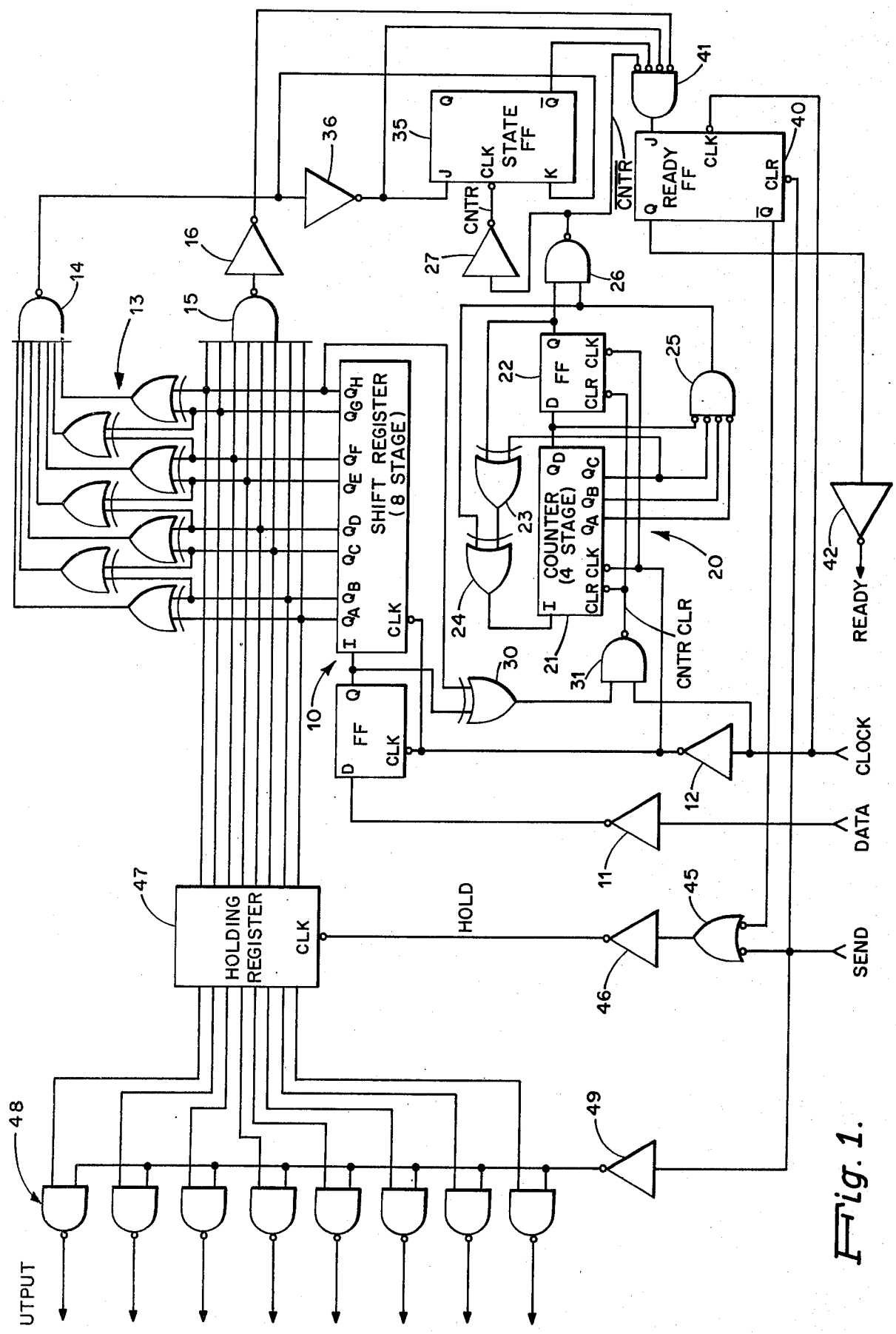
FIG. 1 is a logic diagram of a digital receiver in accordance with the present invention.

The digital receiver as illustrated in FIG. 1 is designed to receive digital signals in serial bit format on the DATA line. The digital bits are received in synchronism with a CLOCK signal on the CLOCK line. The digital words are in an 8-bit permutable code. Prior to receiving an address code word and in the periods between address code words the receiver receives interdigit code words of alternating 1's and 0's (that is, either 10101010 or 01010101).

The receiver must first receive five consecutive identical words of interdigit code in order to be activated. Until the receiver is activated it is unable to accept an address code word. After being activated and then receiving five consecutive identical address code words, the receiver produces a READY signal on the READY line indicating that a valid address code word has been received and accepted. Then, in response to a SEND signal on the SEND line the receiver transmits the 8-bit address code word in parallel on the OUTPUT lines. The receiver is then in the inactive or standby condition and must again be activated by receiving five consecutive identical interdigit code words before receiving another address code word.

The receiver includes a 9-stage input shift register 10 which as is shown in FIG. 1 is formed by an 8-stage shift register in series with a D-type flip-flop. Incoming DATA signals are applied to the shift register through an inverter 11, and the CLOCK signals are applied to the shift register through an inverter 12. The input shift register operates in the usual fashion to shift the bits of DATA as received during each CLOCK pulse from one stage to the next with a total of nine bits being stored in the register at any one time.

As mentioned previously the interdigit signal is a series of alternating 1's and 0's. An interdigit detector including an arrangement of exclusive-OR gates 13 connected to the last eight stages of the input shift register 10 and a NAND gate 14 produces a low level output signal whenever the bits stored in the last eight stages of the shift register constitute an interdigit code word, either 10101010 or 01010101. An all 1's detector in the form of a NAND gate 15 in series with an inverter 16 is also connected to the last eight stages of the shift register 10. The all 1's code word has special significance and is not to be treated as either an interdigit or an address code word.

The receiver includes a count-to-32 counter 20 which is an arrangement of a 4-stage counter 21, a D-type flip-flop 22, exclusive-OR gates 23 and 24, a NOR gate 25, and a NAND gate 26 interconnected as shown in FIG. 1. The counter 20 counts CLOCK pulses which are applied to the clock input of the counter 21 and flip-flop 22 through the inverter 12. A low level signal $\overline{CNTR}$ indicating an accumulated count of 32 is produced at the output of the NAND gate 26, and a high level CNTR signal is produced at the inverter 27 in series with the NAND gate 26. The counter 20 receives a count for each bit of data entered into the input shift register 10.

An exclusive-OR gate 30 has its inputs connected to the first and ninth stages of the input shift register 10. The output of the exclusive-OR gate 30 and the CLOCK signal are applied to a NAND gate 31 which has its output connected to the clear terminals of the counter 20. The exclusive-OR gate 30 detects whether the bits in the first and ninth stages of the input shift register are the same or different. If the bits are the same, the output of the exclusive-OR gate 30 is low inhibiting the NAND gate 31 and permitting the counter 20 to accumulate a count of CLOCK pulses. If the first and ninth bits are different indicating that two consecutive words are not identical, the output of the exclusive-OR gate 30 is high enabling the NAND gate 31. On the next CLOCK pulse a CNTR CLR pulse is applied to the counter 20 resetting it to zero.

The receiver also includes a state flip-flop 35 which is a JK-type flip-flop. The output of the NAND gate 14 of the interdigit detector is applied directly to the K input and through an inverter 36 to the J input. The clock input to the state flip-flop is the CNTR signal which occurs at the end of a count of 32 and operates to change the state of the flip-flop on the trailing edge of each CNTR pulse depending on the signals at the J and K inputs. The occurrence of a CNTR pulse when the output of the NAND gate 14 of the interdigit detector is low causes the state flip-flop 35 to operate in the set condition. This situation exists only when five identical 8-bit words of interdigit code have been received in succession by the shift register 10. If the output from the NAND gate 14 is high indicating that the five consecutive 8-bit words are other than the interdigit code, the state flip-flop 35 is caused to operate in the reset condition. When the state flip-flop 35 is in the set condition, a low level signal is produced at its $\overline{Q}$ output. This signal activates the receiver for receiving address code words as will be explained hereinbelow.

A NOR gate 41 has its output connected to the J input of a JK-type ready flip-flop 40. The four inputs to the NOR gate 41 are the $\overline{Q}$ output from the state flip-flop 35, the output from the inverter 36 which is connected to the interdigit detector, the output from the inverter 16 of the all 1's detector, and the $\overline{CNTR}$ signal from the counter 20. All these signals must be at a low level during a CLOCK pulse in order for the ready flip-flop 40 to be triggered from the reset to the set condition. In order for this situation to occur the state flip-flop 35 must have been triggered previously to the set condition indicating the receipt of five 8-bit consecutive identical interdigit words and the counter 20 must have accumulated a count of 32 indicating that five consecutive identical 8-bit code words have been received. In addition, the code word in the last eight stages of the shift register 10 cannot be an interdigit signal or all 1's. The combination of the signals from the interdigit detector and counter which are necessary to trigger the ready flip-flop 40 to the set condition also triggers the state flip-flop 35 to the reset condition.

When the ready flip-flop 40 is triggered to the set condition, its Q output goes high causing an inverter 42 to produce a low level READY signal. At the same time the $\overline{Q}$ output of the ready flip-flop goes low. This signal is applied to a NAND gate 45 together with a normally high level SEND signal. The output of the NAND gate 45 is inverted by an inverter 46 to produce a low level HOLD signal to the clock input of a holding register 47. The holding register 47 has eight inputs which are connected to the last eight stages of the input shift register 10. The holding register is of the type which produces at its output the same signals present at its corresponding inputs while its clock input is high. When the clock input goes low, the holding register stores the input signals present at the time of the transition. The stored data and consequently the output signals remain the same as long as the clock input remains low.

The outputs of the holding register 47 are connected through individual ones of an arrangement of eight NAND gates 48 to the eight OUTPUT lines. The SEND line is also connected to the NAND gates 48 through an inverter 49. In addition the SEND line is connected to the clear input of the ready flip-flop 40. When the SEND signal goes low, the code word stored in the holding register 47 is read out in parallel through the NAND gates 48 to the OUTPUT lines. The SEND signal also clears the ready flip-flop 40 to the reset condition. Although when the ready flip-flop 40 is reset its $\overline{Q}$ output goes high, the HOLD signal remains low by virtue of the low SEND signal at the NAND gate 45. Upon termination of the low level SEND signal, the NAND gates 48 are no longer enabled and the HOLD signal is terminated. Thus, the digital receiver is restored to its original inactive or standby condition awaiting reactivation by an interdigit signal.

Figure 3A:
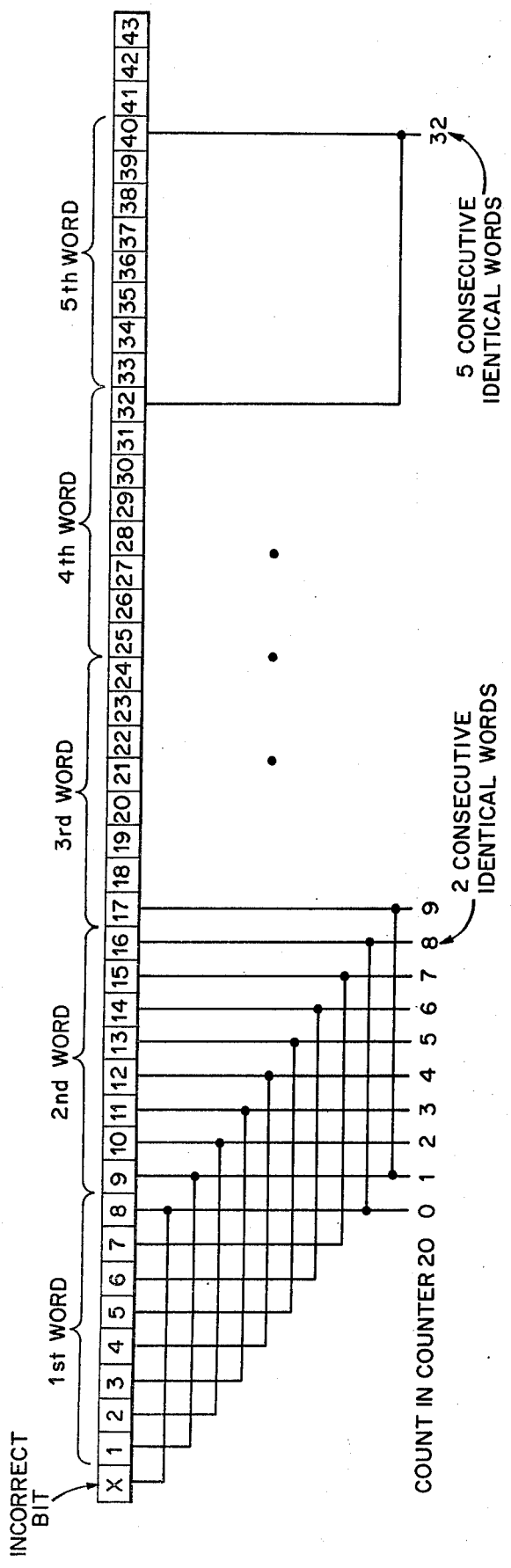
FIGS. 3A and 3B are charts illustrating the counting sequences taking place within the digital receiver of FIG. 1 under two different sets of operating conditions.
Figure 3B:
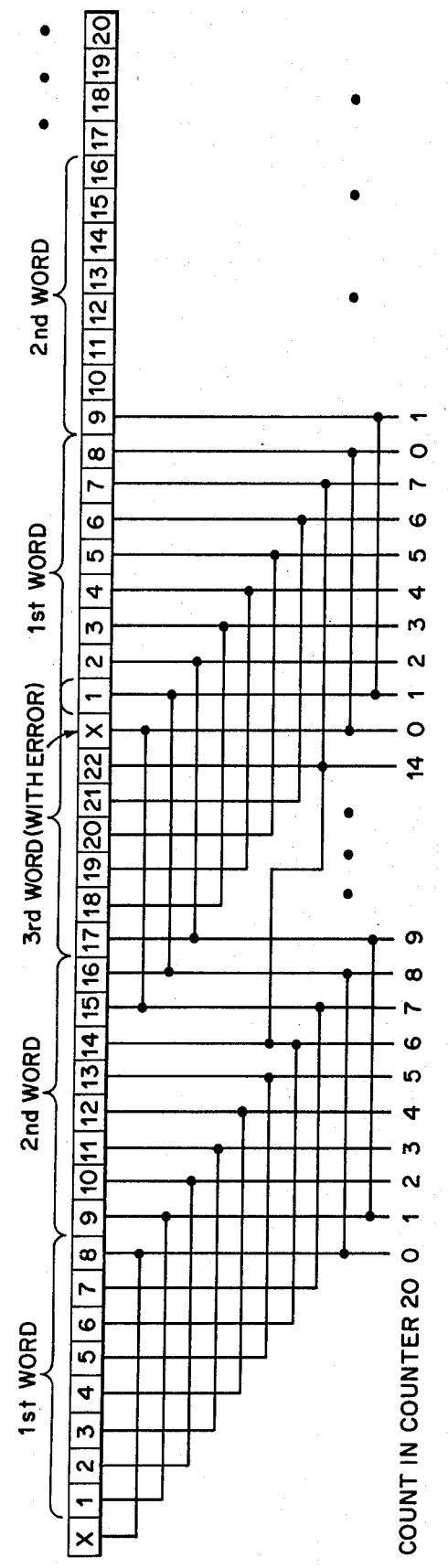

Operation of the digital receiver of FIG. 1 may best be understood by reference to the timing diagram of FIG. 2 together with the charts of FIGS. 3A and 3B illustrating counting sequences. Each bit of DATA is entered in the 9-stage input shift register 10 on a CLOCK pulse. At the same time a count is entered in the counter 20 unless different bits are present in the first and last stages of the input shift register. Whenever this event occurs, the counter is cleared to zero.

FIG. 3B indicates the manner in which a count is accumulated in the counter 20 during a sequence of five identical 8-bit words with no error occurring. The count does not start to accumulate until the first bit of the second word (bit 9) since bits from the previous word in the input shift register 10 would cause the counter to be cleared. Thus, the count in the counter 20 at the end of the fifth word is 32. As shown in FIG. 2 at the trailing edge of the next CLOCK pulse, which places the last word received in the last eight stages of the input shift register, the counter 20 produces a negative-going $\overline{CNTR}$ signal 51, and also a positive-going CNTR signal.

If the received words were interdigit words of alternating 1's and 0's, the interdigit detector of gates 13 and 14 together with inverter 36 produces a high level signal at the J input and a low level signal at the K input of the state flip-flop 35. On the trailing edge of the CNTR pulse which occurs on the trailing edge of the next CLOCK pulse the state flip-flop is triggered to the set condition and as shown in FIG. 2 the Q output 52 goes low. At this point the receiver is activated and is in condition to receive an address code word. Continued receiving of further interdigit code words with or without occasional errors has no effect on the receiver and it remains in the active condition.

When an address code word is received at the DATA input of the activated receiver, the count in the counter 20 accumulates in the same manner as shown in FIG. 3A. A count of 32 is reached when the same 8-bit address code word has been received five times in succession. Again as shown in FIG. 2 on the next following CLOCK pulse which advances the word so that it is in the last eight stages of the shift register 10 the counter 20 produces a $\overline{\text{CNTR}}$ signal 53 and a CNTR signal.

Since an address code word is present in the input register 10, the inputs to the NOR gate 41 from the interdigit detector and the all 1's detector are both low. As shown in FIG. 2 the $\overline{Q}$ output 52 from the state flip-flop is also low so that when the $\overline{\text{CNTR}}$ signal 53 goes low, the NOR gate 41 produces a high level at the J input of the ready flip-flop 40. Thus, on the trailing edge of the next CLOCK pulse the ready flip-flop 40 is triggered to the set condition and the negative-going READY signal 54 is produced by the inverter 42 connected to the Q output. At the same time the $\overline{Q}$ output of the ready flip-flop 40 goes low causing a low HOLD signal 55 at the clock input of the holding register 47. This signal causes the address code word which is stored in the last eight stages of the input register 10 to be latched in the holding register 47. Also on the trailing edge of the CLOCK pulse the $\overline{\text{CNTR}}$ signal 53 and CNTR signal are terminated triggering the state flip-flop 35 to the reset condition with its $\overline{Q}$ output 52 high.

When a low level SEND signal 56 is received, the NAND gates 48 are enabled and the eight bits of the address code word in the holding register 47 are read out in parallel on the OUTPUT lines. The SEND signal also clears the ready flip-flop 40 restoring it to the reset condition. The READY signal 54 is thereby terminated. The presence of the low SEND signal 56 at the input to the NAND gate 45 causes the HOLD signal 55 to remain even though the $\overline{Q}$ output of the ready flip-flop 40 goes high. Upon termination of the SEND signal 56 the HOLD signal 55 is also terminated and the receiver is restored to its inactive state in preparation for being activated by a sequence of interdigit signals.

FIG. 3B illustrates the manner in which the counter 20 accumulates a count when an error occurs, specifically during an interdigit signal. As illustrated in FIG. 3B the count accumulates as explained previously until an incorrect bit occurs, for example the seventh bit of the third word. Since the exclusive-OR gate 30 detects that the bit in the first stage of the input register 10 is not the same as the bit stored in the ninth stage, a CNTR CLR pulse 57 is produced on the next CLOCK pulse as shown in FIG. 2. This pulse clears the counter 20 to zero. Since the error is a single bit in the interdigit signal the count begins to accumulate with each bit. However, when the incorrect bit reaches the ninth stage of the input register 10, a CNTR CLK pulse again clears the counter to zero. The count is again resumed on the next bit and in the absence of more errors the count reaches 32 after five consecutive interdigit words.

Thus, while there has been shown and described what is considered a preferred embodiment of the present invention, it will be obvious to those skilled in the art that various changes and modifications may be made therein without departing from the invention as defined in the appended claims.

What is claimed is:

1. Digital receiving apparatus comprising
    input storage means for receiving and storing digital words; detection means coupled to said input storage means for detecting the presence or absence of particular digital code words stored in said input storage means;
    counting means coupled to said input storage means for determining when said input storage means has received a predetermined number of identical digital words in succession;
    first control means coupled to said detection means and to said counting means for producing an indication in response to a determination that said predetermined number of identical particular digital code words have been received by said input storage means;
    second control means coupled to said detection means, to said counting means, and to said first control means for producing an indication in response to said detection means detecting the absence of said particular digital code words being stored in the input storage means, said counting means determining that the input storage means has received said predetermined number of identical digital words in succession, and said first control means producing an indication;
    output storage means coupled to said input storage means and to said second control means for receiving and storing a digital word stored in the said input storage means in response to an indication from said second control means;
    output gating means coupled to said output storage means, and
    output control means for applying a readout signal to said output gating means to read out the digital word stored in said output storage means.

2. Digital receiving apparatus in accordance with claim 1 wherein
    said detection means is operable to produce an output signal during the presence of particular digital code words stored in said input storage means;
    said counting means is operable to produce an output signal in response to determining that said input storage means has received said predetermined number of identical digital words in succession;
    said first control means is operable to produce said indication in response to receiving coincident output signals from said detection means and said counting means; and
    said second control means is operable to produce said indication in response to an output signal from said counting means during the absence of an output signal from said detection means and the presence of an indication from said first control means.

3. Digital receiving apparatus in accordance with claim 2 wherein
    said first control means has a first and a second operating state and produces said indication when in said second operating state, said first control means being triggered from the first operating state to the second operating state in response to an output signal from said counting means while said detection means is producing an output signal, and being triggered from the second operating state to the first operating state in response to an output signal from said counting means during the absence of an output signal from said detection means; and
    said second control means has a first and a second operating state and produces said indication when in said second operating state, said second control means being triggered from the first operating state to the second operating state in response to the coincidence of an indication from the first control means, an output signal from the counting means, and the absence of an output signal from the detection means, and being triggered from the second operating state to the first operating state in response to a signal applied thereto at a clear input connection.

4. Digital receiving apparatus in accordance with claim 3 wherein said output storage means is operable to store a digital word which is stored in said input storage means at the start of an indication from said second control means and to retain the stored digital word during the presence of the indication;

said output control means is coupled to said output gating means, to said output storage means, and to the clear input connection of said second control means;

said second control means is operable to be triggered from the second operating state to the first operating state by the start of a readout signal at its clear input connection; and said output control means includes means operable to produce an indication to said output storage means maintaining the digital word stored therein during a readout signal after the second control means has been triggered to the first operating state.

5. Digital receiving apparatus in accordance with claim 4 wherein each digital word consists of N bits;

said input storage means includes shift register means having N+1 stages;

said counting means includes count accumulating means operable to record a count for each bit received by said shift register means and to produce an output signal when the accumulated count reaches a preset value indicating said predetermined number of digital words have been received, and count clearing means coupled to the first and last stages of said N+1 stages of the shift register means and to said count accumulating means, said count clearing means being operable to clear said count accumulating means of the accumulated count when the first and last stages contain dissimilar bits indicating that two digital words in succession are not identical.

\* \* \* \* \*